(No Model.)

P. HUBER.
PROCESS OF ELECTRIZING WATER FOR HEATING PURPOSES.

No. 558,176. Patented Apr. 14, 1896.

WITNESSES:

Philipp Huber, INVENTOR

BY

ATTORNEY

UNITED STATES PATENT OFFICE.

PHILIPP HUBER, OF SAGINAW, MICHIGAN.

PROCESS OF ELECTRIZING WATER FOR HEATING PURPOSES.

SPECIFICATION forming part of Letters Patent No. 558,176, dated April 14, 1896.

Application filed April 1, 1895. Serial No. 543,979. (No model.)

*To all whom it may concern:*

Be it known that I, PHILIPP HUBER, a citizen of the United States, residing at Saginaw, in the county of Saginaw and State of Michigan, have invented a certain new and useful Process for Electrizing Water for Heating Purposes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a heating system, and comprises the manufacture of oxygen and hydrogen gases by the electrization of water and storing and using these gases for heating.

Figure 2:
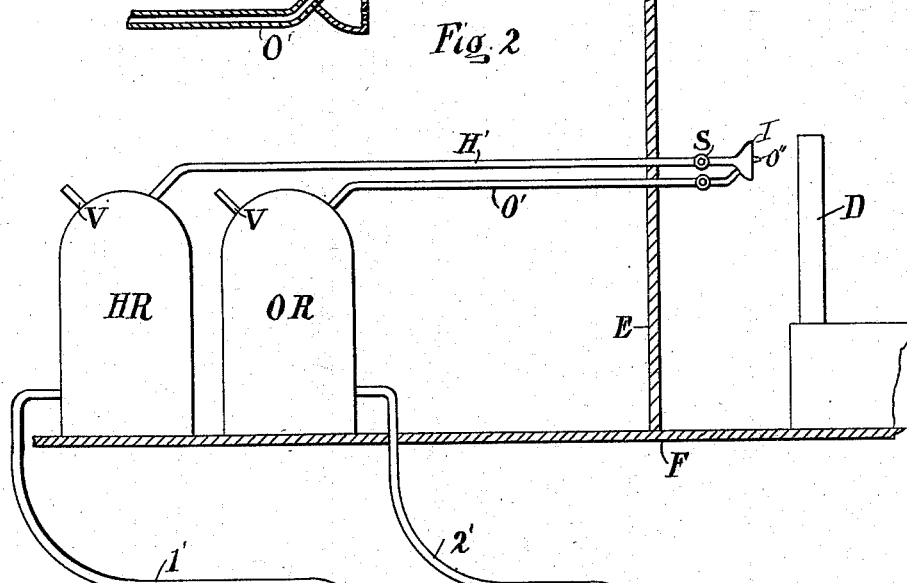
Figure 1:
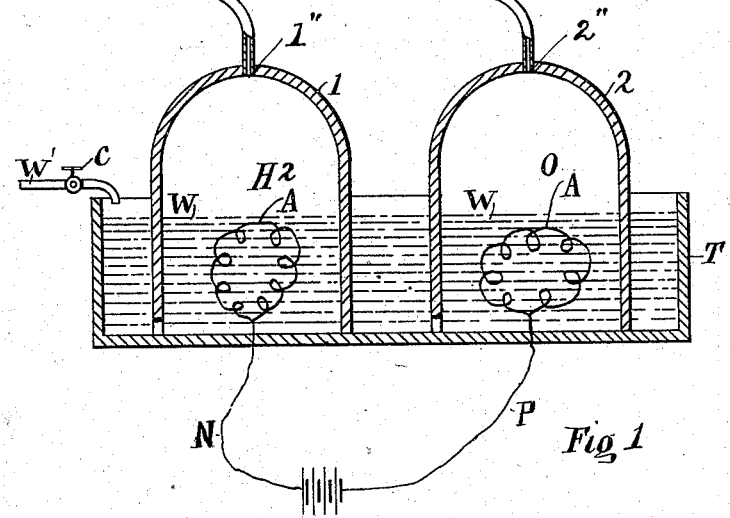

Figure 1 is an elevation, in part sectional, of my apparatus. Fig. 2 is a sectional view of the burner.

In the drawings, T is a tub supplied with water W through the water-pipes W', controlled by the stop-cock C.

1 and 2 are bottomless jars placed in the water, having pipes 1' and 2' connected to the top of each, respectively, and openings 1'' and 2'' in each, respectively, forming a communication between the jars and tank.

B is a battery or source of electricity.

N and P are wires leading from each side of the battery through the tub into each jar, the wire N into the jar 1 and the wire P into the jar 2. To the end of these wires within the jars is secured a platinum wire A, as shown, P being the positive and N the negative poles of the battery.

It is a well-known fact that water by electrization may be converted into its native gases, hydrogen and oxygen, ($H_2O$,) and that the positive pole of a battery will generate oxygen gas and the negative pole hydrogen gas. Thus by electrizing water I am enabled to convert it into gases, oxygen in the jar 2 and hydrogen in the jar 1. By having a continuous supply of water in the tub the gas may be continuously generated.

The pipes 1' and 2' lead, respectively, to reservoirs HR and OR, where the gases may be stored for use. From these reservoirs a pipe extends from each to the burner I, the pipe O' from the reservoir containing oxygen and the pipe H' from the reservoir containing hydrogen. The pipe H' terminates in a bulb having a straight front surface punctured with minute holes I'. The pipe O' passes into this bulb to the center of its front surface and extends for a short distance beyond the surface of the burner I. The hydrogen gas is thus made to pass out through the burner through the holes I', while the oxygen gas is conveyed to the center of the burner through a single orifice O''.

S S are stop-cocks in the rear of the burner for controlling the supply of gas. Igniting the gas at the burner-surface produces an intense heat. It is well known to chemists that by placing in front of a burner a radiator to receive and reflect the heat a room may be readily heated.

In the drawings, D is a radiator, which preferably is of stone, as the heat is so intense that iron or other metal would be melted. It is obvious that this radiator may be of any form and design that may be suggested by mechanical or artistic skill—such as figures of animals, persons, &c.

V are safety-valves in the reservoirs that resist the pressure of the gases to a certain degree, so that when too much gas is accumulated they will open and allow the gas to escape into the open air.

F is the floor of the room, and E the wall.

The gas-generating apparatus may be placed in the cellar or any other part of the building, with the pipes 1' and 2' extending to the burner in any part of the building.

It is obvious that the heating-pipes may extend directly to the burner without passing to a storage reservoir and that the supply of gas to the burner through these pipes may be regulated by valves or stop-cocks.

As previously stated, I am aware that for experimental purposes before chemical classes hydrogen and oxygen have been manufactured as described; but I am not aware that the same have ever been used for the purpose to which I have applied them—viz., for heating.

Therefore what I claim as new, and desire to secure by Letters Patent, is—

In a heating system, the combination with an apparatus for the manufacture of hydrogen and oxygen gases from water by the electrization thereof, and for separating the gases and storing them, of tubes conveying the gases in separate pipes to a burner, the tube conveying the oxygen gas passing through the face of the burner at the middle thereof and terminating just in front of the burner, and the tube conveying the hydrogen gas having the burner formed upon the end thereof, the burner being circular in form and provided with small holes on its front face through which the hydrogen passes, and means in front of the burner for receiving and radiating the heat, and means as described for regulating the supply of gas to the burner, substantially as and for the purpose set forth.

In testimony whereof I affix my signature in presence of two witnesses.

PHILIPP HUBER.

Witnesses:
A. H. SWARTHOUT,
J. F. O'KEEFE.